No. 668,158. Patented Feb. 19, 1901.
R. BÜRK.
WORKMAN'S TIME CHECKING APPARATUS.
(Application filed Nov. 1, 1897.)
(No Model.) 6 Sheets—Sheet 1.

Witnesses
A. Raymund Gloetzner
N. Mitchell

Inventor.
Richard Bürk
by Max Georgii
his Attorney

No. 668,158. Patented Feb. 19, 1901.
R. BÜRK.
WORKMAN'S TIME CHECKING APPARATUS.
(Application filed Nov. 1, 1897.)
(No Model.) 6 Sheets—Sheet 2.
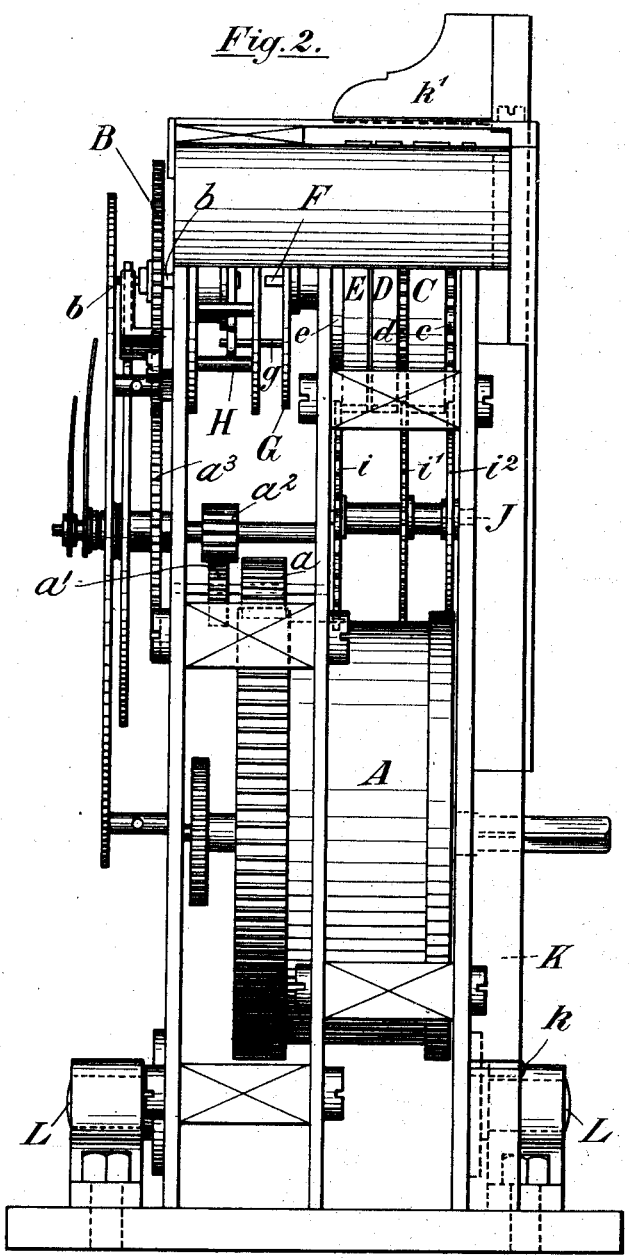
Witnesses
A. Raymund Gloetzner
N. Mitchell.
Inventor
Richard Bürk
by Max Georgii
his Attorney No. 668,158. Patented Feb. 19, 1901.
R. BÜRK.
WORKMAN'S TIME CHECKING APPARATUS.
(Application filed Nov. 1, 1897.)
(No Model.) 6 Sheets—Sheet 3.
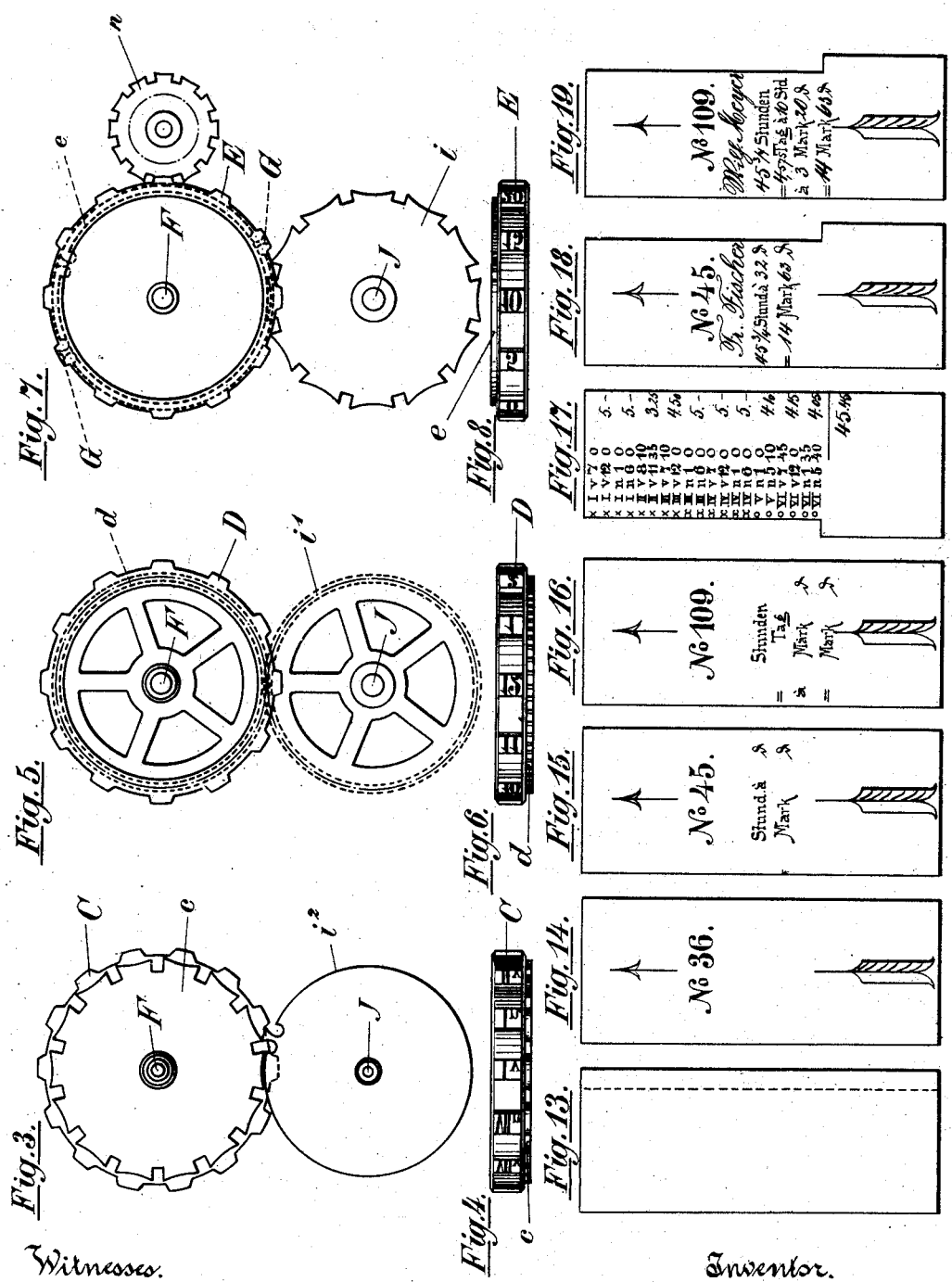
Witnesses.
A. Raymund Gloetzner
N. Mitchell
Inventor.
Richard Bürk
by Max Georgii
his Attorney No. 668,158. Patented Feb. 19, 1901.
R. BÜRK.
WORKMAN'S TIME CHECKING APPARATUS.
(Application filed Nov. 1, 1897.)
(No Model.) 6 Sheets—Sheet 4.
Fig. 9.
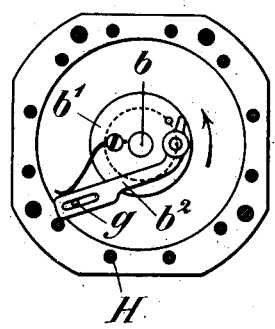
Fig. 10.
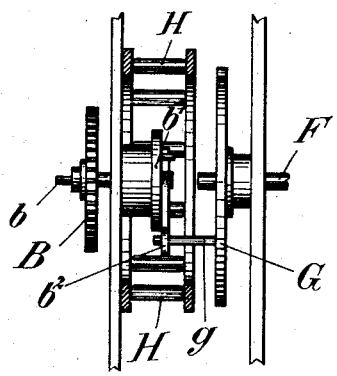
Fig. 11.
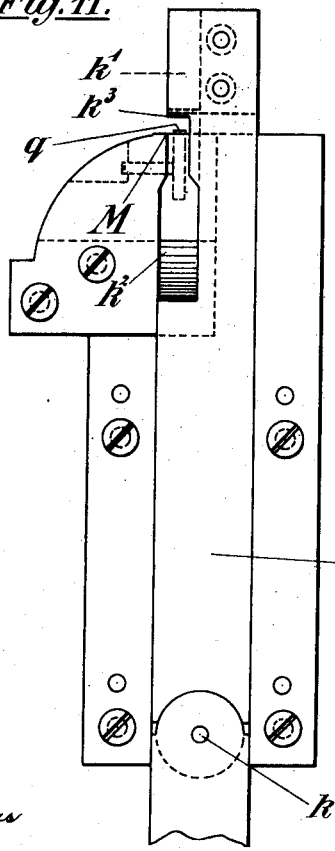
Fig. 12.
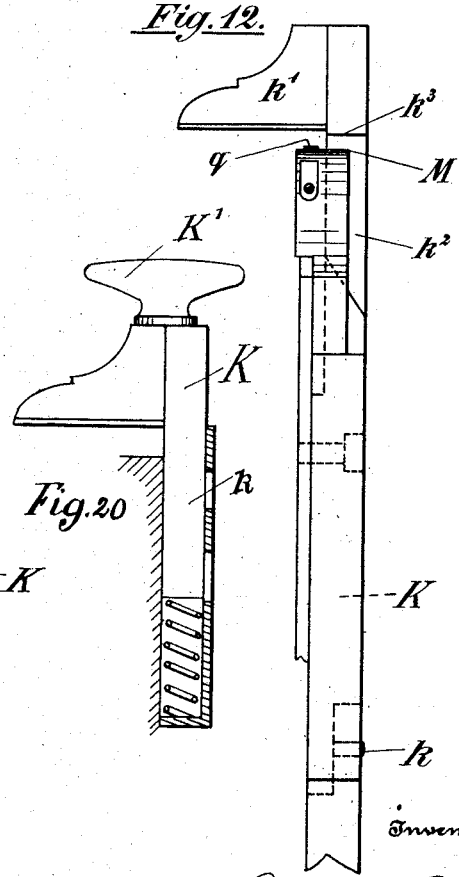
Fig. 20.
Witnesses
A. Raymund Gloetzner
N. Mitchell
Inventor
Richard Bürk
by Max Georgii
his Attorney No. 668,158. Patented Feb. 19, 1901.
R. BÜRK.
WORKMAN'S TIME CHECKING APPARATUS.
(Application filed Nov. 1, 1897.)
(No Model.) 6 Sheets—Sheet 5.

Witnesses:
Anton A. Gloetzner,
William H. Reid.

Inventor:
Richard Bürk,
by Max Tray
Attorney

THE NORRIS PETERS CO., PHOTO-LITHO., WASHINGTON, D. C.

No. 668,158. Patented Feb. 19, 1901.
R. BÜRK.
WORKMAN'S TIME CHECKING APPARATUS.
(Application filed Nov. 1, 1897.)
(No Model.) 6 Sheets—Sheet 6.
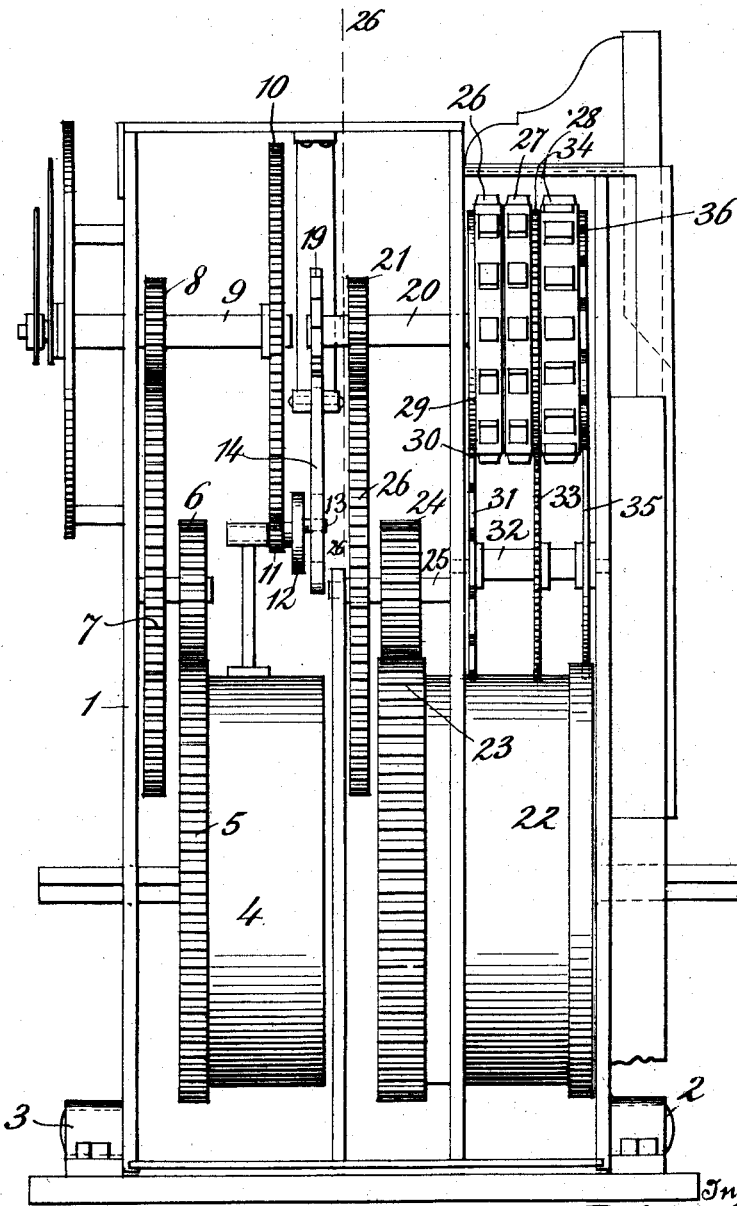
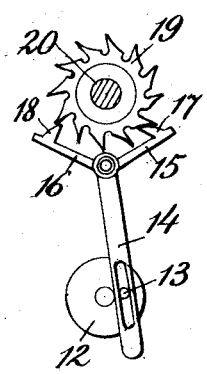
Witnesses: Inventor:
F. H. Schott Richard Bürk,
Anton A. Roetzner By ........ Attorney.

United States Patent Office.

RICHARD BÜRK, OF SCHROENNINGEN, GERMANY.

WORKMAN'S TIME-CHECKING APPARATUS.

SPECIFICATION forming part of Letters Patent No. 668,158, dated February 19, 1901.

Application filed November 1, 1897. Serial No. 657,066. (No model.)

*To all whom it may concern:*

Be it known that I, RICHARD BÜRK, a citizen of the Empire of Germany, residing at Schroenningen, in the Kingdom of Würtemberg, Germany, have invented certain new and useful Improvements in Workmen's Time-Checking Apparatus, (patented to me in Germany September 19, 1897, No. 98,786, and in Great Britain October 5, 1897, No. 22,855;) and I do hereby declare the following to be a full, clear, and exact description of the invention, such as will enable others skilled in the art to which it appertains to make and use the same.

This invention has for its object an improved workman's time-checking apparatus; and it consists of an ordinary clockwork mechanism in combination with a type mechanism and stamping mechanism operated by the said clockwork or other device, in which the workman on entering and leaving the works has to insert and have stamped a card which is given him for this purpose for a given period of time—for instance, extending over a week.

Figure 1:
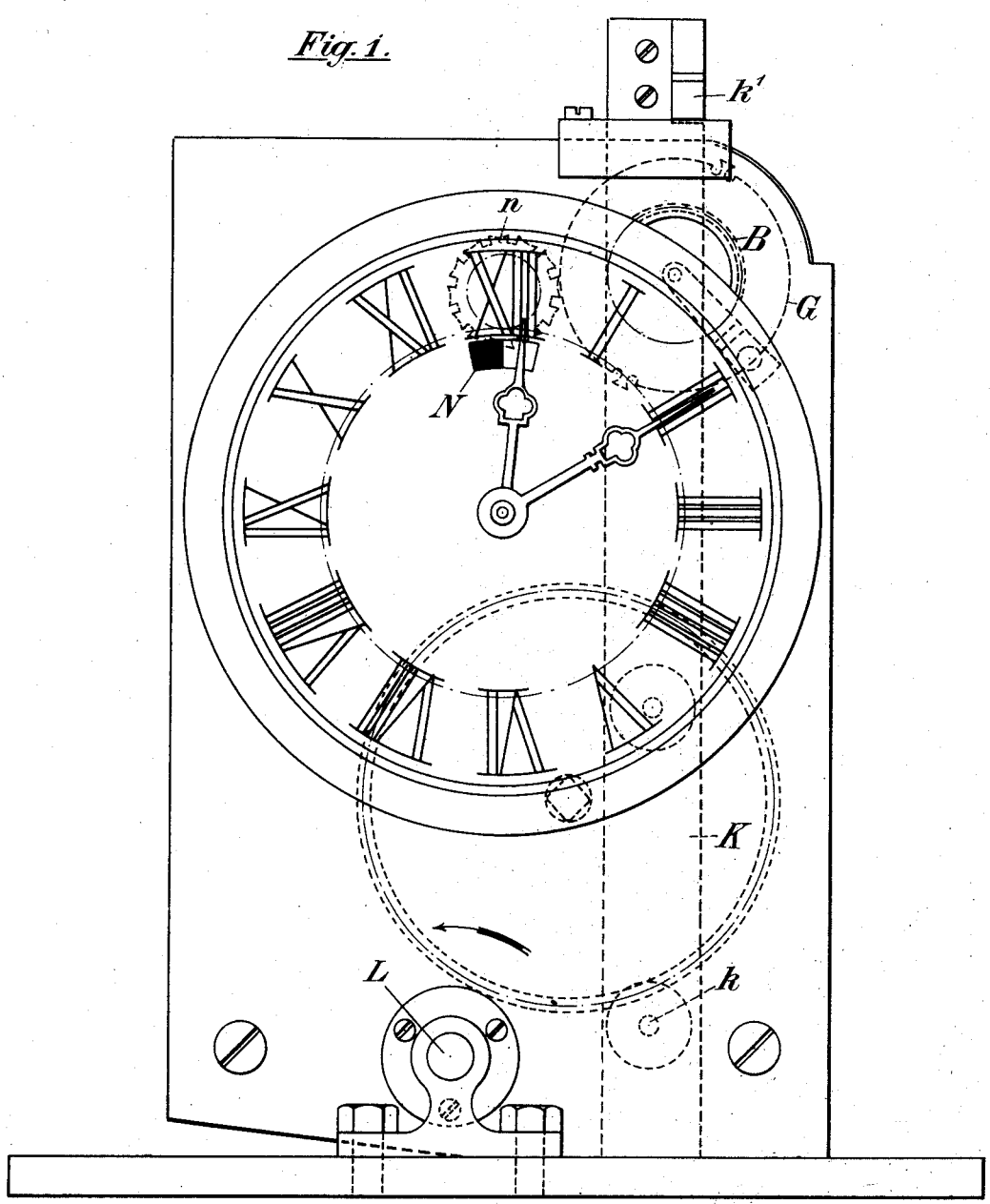
Figure 21:
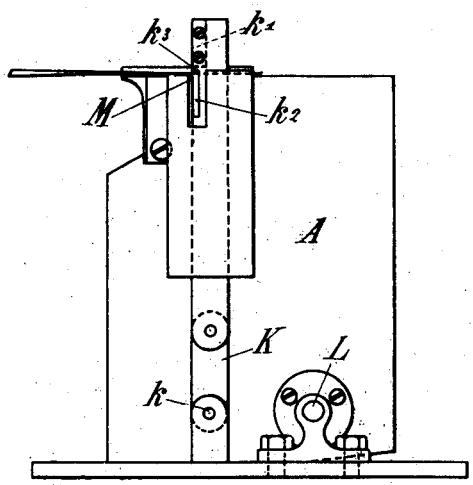
Figure 22:
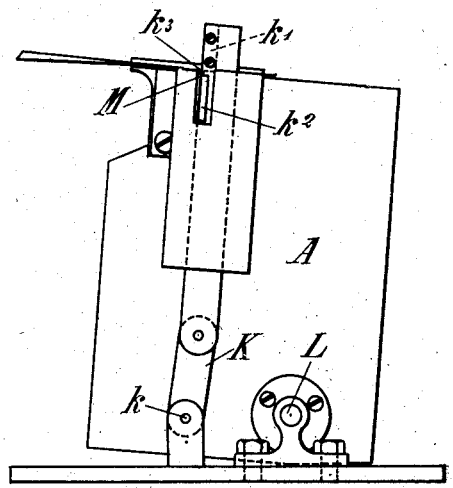
Figure 23:
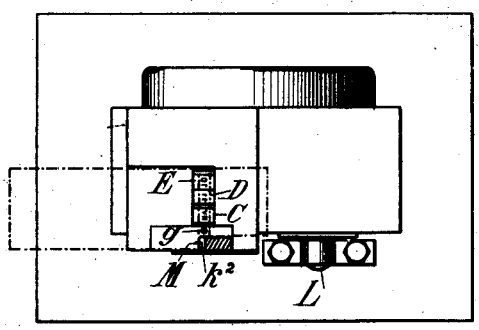
Figure 24:
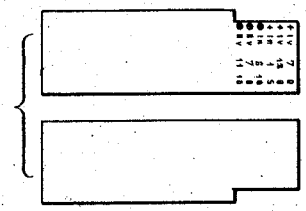

In the accompanying drawings, Figure 1 shows a front view of the apparatus. Fig. 2 is a side view with the casing removed. Figs. 3 to 8, inclusive, show the type-wheels, with their immediate driving-wheels. Fig. 9 shows the type-wheel-actuating mechanism. Fig. 10 shows the same from a side view. Figs. 11 and 12 show the slip-notching mechanism. Figs. 13 to 19, inclusive, show the slip in various stages of printing. Fig. 20 shows a modification of the stamping means. Figs. 21 and 22 show the two positions of the slip-notching mechanism as viewed from the rear of the case. Fig. 23 is a plan view of the notching mechanism. Fig. 24 shows a notched and printed slip on each side. Fig. 25 shows a modification in which the type-wheels are driven by a special motor. Fig. 26 is a section of Fig. 25 on the lines 26 26, showing the escapement.

As shown in the accompanying drawings (in Fig. 13) the card is blank on one side and has on the other side preferably an arrow, Fig. 14, indicating the direction in which to insert the card in the checking apparatus, and its upper side has also the number of the workman and his name and, if desired, also the words indicating the periods of time and also the amount of pay, so that when the card is full the differences between the times of entrance and the times of exit of the workman on the one side of the card may be calculated and correctly entered in the column and added up, Fig. 17, and the total be then filled in on the other side, as shown in Figs. 18 and 19, so that the card can serve at the same time as a basis for the calculation of wages. If desired, the back of the card may also bear the date of the week or the like.

The apparatus itself, (shown in Fig. 1 in front view and Fig. 2 in side view,) which is erected at the entrance to the works, consists of an ordinary clockwork A, which by means of a spur-wheel B, through spur-wheels $a\ a'\ a^2\ a^3$, operates the type mechanism. The latter in the present instance shows minutes, hours, the date, and the day of the week, and consists of three type-wheels C D E, Figs. 3 to 8, mounted over concentric spindles F. C serves for indicating the day of the week and the date, D the hours, and E the minutes in intervals of five minutes. The wheel C may have marks on its periphery to indicate the morning and afternoon and also the days of the week, &c. The second-wheel D has on its periphery the hours "1" to "12," Fig. 6, while the wheel E, Fig. 8, has indications of the minutes "5" "10" "15" and so on up to "55." These three type-wheels are driven by the clockwork, so that the types do not gradually place themselves on the marking line under the stamp, but intermittently or step by step. For this object the minute-wheel E, Fig. 7, is keyed together with a pin-wheel G firmly on a spindle F, while on the spindle $b$ of the driving spur-wheel B there is firmly mounted a disk $b'$ with an arm or link $b^2$ eccentrically pivoted on it, the other end of said link $b^2$ being slotted to receive the pin $g$ of the wheel G. In consequence of the rotation of the spindle $b$ the link $b^2$ under the action of a spring will bear in succession over twelve rollers H, which are arranged around the shaft $b$ at equal distances apart in a cylindrical manner, the said link being slowly drawn by the disk $b'$ first from the one roller (compressing the spring) until it slips off this roller and is thrown by the spring against the next roller, &c., as is easily seen by reference to Fig. 9. As, however, the link $b^2$ engages by means of its slot the catch-pin $g$, mounted on the disk G, the minute-wheel E will also receive such a step-by-step or intermittent movement, which is arranged to take place every five minutes. The wheel E conveys its rotation to the type-wheels D and C by means of scape-disks $e$ $i^2$, by spur-wheels $i$ and $c$, and the toothed wheels $d$ $i'$ in the ordinary manner and in such a way that the wheel D moves every hour and the wheel C every twelve hours to the extent of one step. The wheels $i$, $i'$, and $i^2$ are compulsorily revoluble with one another on a spindle J. In this manner at a given place on the wheel E the numbers "5" "10" "15," &c., on the wheel D the numbers "1" "2" "3" "4," &c., up to "12," and on the wheel C, finally, the indications for morning and afternoon of the several week days appear successively, so that an impression taken at that given place yields the appearance of one of the lines shown on the card in Fig. 17. In order to obtain these impressions, various devices may be employed. In the example shown in the drawings there is preferably employed a stamp K, Figs. 1, 2, 11, and 12, slidably mounted at the side or back of the frame of the apparatus and hinged on the base-plate at $k$, which stamp engages across all the type-wheels by a projection $k'$, formed on its upper end. The whole apparatus oscillates on bolts or trunnions L on the base-plate. On a card being inserted in the space between the type-wheels and the projection $k'$ and on an oscillation in the direction of the arrow 1, Fig. 1, being then imparted to the apparatus the projection $k'$ will press the card onto the type-wheels and the card will thus receive on its under side the indications of the type-wheels, which are precisely brought by the clockwork under the projection $k'$—for instance, "1m. 7 hours 0 minutes," which indicates that the stamping took place on the first day of the pay week at seven o'clock in the morning.

In order that the separate stampings may follow one another in regular succession, Fig. 17—that is to say, that the card may be inserted each time to a given height of line farther under the projection $k'$—the stamp K in addition to its projection has also a slot $k^2$ and a projection $k^3$ of rectangular cross-section adapted at each stamping to act in combination with the sharp upper edge M of the guide of the stamp to cut off from the side of the card a rectangular piece, so that the card at the next stamping can be inserted to the amount of this cut-off piece farther under the projection $k'$.

In place of this stamping apparatus the one shown in Fig. 20 may be employed, in which the whole apparatus is immovably mounted on the base-plate, while the stamp K has a knob K' at the top and is mounted reciprocally on springs in the casing of the apparatus, &c.

In order to avoid frauds, a check-type $q$, consisting of a cross, circle, or the like, (see Figs. 11, 12, and 17,) is arranged beside the type-wheels, which check device is changed at irregular times and without the knowledge of the workmen. This check device is mounted in a suitable recess and is secured in the same by means of a pointed screw or other suitable device.

It must further be noted that a slot N, Fig. 1, is preferably formed in the dial of the clock, behind which moves a disk which is partially black and partially white, which disk is driven from the type-wheel E by the intermediary of the pin-wheel G and a pinion $n$, Fig. 7. In this manner it can be known at any time whether the printing mechanism is indicating night or day time. The type mechanism may of course be arranged to indicate continuously separate minutes or for fourteen days or for a month or the like without the essential part of the apparatus being altered and without departing from the scope of the invention. The apparatus may also have a series of type mechanisms which are then, however, preferably driven by a specially strong mechanism or train which is periodically released by the clockwork—for instance, in the present case every five minutes. This modification may consist of the device shown in Fig. 25, in which a mainspring 4, through the medium of gears 5, 6, 7, and 8, drives an arbor 9, to which is attached the minute-hand of the clock, and hence this shaft makes one revolution in an hour. On the shaft 9 is a large gear 10, engaging the small gear 11, the gear being so proportioned that the gear 11 makes twelve revolutions to one of the gear 10. Hence it rotates once every five minutes. A disk 12 is connected with the gear 11 and contains a crank-pin 13, that engages the walls of a slotted arm 14, which latter is rigidly connected with an escapement-anchor 15 16. The disk 12 will consequently cause the anchor to make one oscillation back and forth every five minutes. On the shaft 20 are mounted the type-wheels 26, 27, and 28, corresponding to the type-wheels C D E, hereinbefore described. The first type-wheel 26, through the medium of gear-wheel 31, shaft 32, and gears 33 and 34, rotates the gear 27. A disk 35 is also secured to the shaft 32 and has a pin engaging notches in a disk 36, and thereby rotating intermittently the type-wheel 28 similar to those above mentioned. A spring 22, through the medium of gears 23, 24, 26, and 21, serves to actuate the shaft 20, and consequently rotate the type-wheels 26, 27, and 28. On the extremity of the shaft 20 is mounted an escapement-wheel 19, governed by said anchor 15 16. This wheel 19 has twelve escapement-teeth, and consequently as the anchor is rocked once every five minutes this wheel will make a complete revolution in an hour, as also will the first type-wheel 26, and the type-wheels 27 and 28 are driven from the type-wheel 26 in the manner above described.

Having now particularly described and ascertained the nature of my said invention and in what manner the same is to be performed, I declare that what I claim is—

1. The combination in a device of the character described, with a case containing a marking device, of a suitable base, said case being movably mounted on said base, an arm mounted on said base and having a projection in proximity to the marking device, a guideway for directing the slip along over the marking device, a stop at one side of said guideway for limiting the entrance of the slip to be marked in the guideway, said case when moved with respect to said base bringing said marking device into and out of contact with said stop and simultaneously severing a portion of the strip at one end for a width equal to the width of said stop to allow the strip to be inserted a distance equal to the longitudinal depth of the portion severed.

2. The combination in a device of the character described, with a case containing a marking device, of a suitable base, said case being pivotally mounted on said base, an arm mounted on said base and having a projection in proximity to said marking device, a guideway for directing the slip along over a marking device, a stop at one side of said guideway for limiting the entrance of the slip to be marked in the guideway, said case when oscillated on such base bringing said marking device into and out of contact with said stop and simultaneously severing a portion of the strip at one end for a width equal to the width of said stop to allow the strip to be inserted a distance equal to the longitudinal depth of the portion severed.

3. The combination in a device of the character described, with a case containing a marking device, of a suitable base, said case being pivotally mounted on said base, an arm mounted on said base and having a projection in proximity to said marking device, a guideway for directing the slip to be marked along over the marking device, a stop at one side of said guideway for limiting the entrance of the slip to be marked in the guideway, said case when oscillated with respect to said base bringing said marking device into and out of contact with said stop and simultaneously severing a portion of the strip at one end for a width equal to the width of the said stop to allow the strip to be inserted for the next impression for a distance equal to the longitudinal depth of the portion severed.

4. The combination in a device of the character described, with a case containing a marking device, said case having a slot in the top at which the marking device is exposed, of a suitable base, said case being pivotally mounted on said base, a guideway at the rear of the case, an arm adapted to reciprocate in said guideway, a lug projecting upwardly from said base, a bar pivoted by one extremity to said lug and by its other extremity to said arm, a stop secured to said arm and projecting over the top of said case and in the path of movement of the said exposed portion of the marking device, said stop adapted to contact with the marking device on the oscillation of the case, a guideway for directing the slip to be marked along over said slot in the case, said reciprocating arm having a notched portion whose vertical wall limits the farther entrance of a slip wider than said guideway when the slip is in position to be marked, and whose upper wall on the said marking oscillation of the case severs a portion of the end of a slip wider than said guideway to allow the slip to be farther inserted for the next impression.

5. The combination in a device of the character described, with a case containing type-wheels and means for rotating them, the type-wheels being exposed for impression at the top of said case, of a suitable base, said case being pivotally mounted on said base, a guideway at the rear of the case, an arm adapted to reciprocate in said guideway, a lug projecting upwardly from said base, a bar pivoted by one extremity to said lug and by its other extremity to said arm, a stop secured to said arm and projecting over the top of said case and in the path of movement of the exposed portion of the type-wheels, said stop adapted to contact with the type-wheels on the oscillation of the case.

6. The combination in a device of the character described, with a case containing type-wheels and means for rotating them, the type-wheels being exposed at the top of said case, of a suitable base, said case being pivotally mounted on said base, an arm connected to said base and projecting upwardly therefrom, a stop secured to said arm and extending over the top of said case and in the path of movement of said exposed portion of the type-wheels, said stop adapted to contact with the type-wheels on the oscillation of the case.

7. The combination in a device of the character described, with a case containing type-wheels and means for rotating them, the type-wheels being exposed at the top of said case, of a suitable base, said case being pivotally mounted on said base, a lug projecting upwardly from said base, an arm pivoted by one extremity to said lug, a stop connected with said arm and projecting over the top of said case and in the path of movement of said exposed portion of the type-wheels, said stop arranged to contact with the type-wheels on the oscillation of the case.

8. The combination in a device of the character described, with a case containing type-wheels and the means for rotating them, of a suitable base, said case being movably mounted on said base, an arm mounted on said base and having a projection in proximity to said type-wheels, a guideway for directing a slip to be printed along over the type-wheels a stop at one side of said guideway for limiting the entrance of the slip to be printed into the guideway, said case when moved with respect to said base bringing said type-wheels into and out of contact with said stop and simultaneously severing a portion of the strip at one end for a width equal to the width of said stop to allow the strip to be inserted for a distance equal to the longitudinal depth of the portion severed.

9. The combination in a device of the character described, with a case containing type-wheels and means for rotating them, of a suitable base, said case being pivotally mounted on said base, an arm mounted on said base and having a projection in proximity to said type-wheels, a guideway for directing a slip to be printed along over the type-wheels, a stop at one side of said guideway for limiting the entrance of the slip to be printed in the guideway, said case when oscillated with respect to said base, bringing said type-wheels into and out of contact with said stop and simultaneously severing a portion of the strip at one end for a width equal to the width of said stop to allow the strip to be inserted for the next impression for a distance equal to the longitudinal depth of the portion severed.

10. The combination in a device of the character described, with a case containing type-wheels and means for rotating them, said case having a slot in the top at which said type-wheels are exposed, of a suitable base, said case being pivotally mounted on said base, a guideway at the rear of the case, an arm adapted to reciprocate in said guideway, a lug projecting upwardly from said base, a bar pivoted by one extremity to said lug and by its other extremity to said arm, a stop secured to said arm and projecting over the top of said case and in the path of movement of the said exposed portion of the type-wheels, said stop adapted to contact with the type-wheels on the oscillation of the case, a guideway for directing the slip to be printed along over the said slot in the case, said reciprocating arm having a notched portion whose vertical wall limits the further entrance of a slip wider than said guideway when the slip is in position to be printed, and whose upper wall on the said printing oscillation of the case severs a portion of the end of a slip wider than said guideway to allow the slip to be further inserted for the next impression.

11. In a device of the character described, the combination with clockwork and type-wheels arranged to revolve at different relative speeds for indicating minutes, hours and days, of means for causing said clockwork to drive said type-wheels by a step-by-step movement, said means comprising a spindle driven by said clockwork, a disk mounted on said spindle, a pin projecting from the face of said disk, an arm pivotally mounted on said pin and having a slot in its free extremity, a spindle connected with said type-wheels, a disk mounted on said latter spindle, a pin projecting from the face of said latter disk and being engaged by the walls of the slot in said arm and adapted to actuate said type-wheels by the movement of said former disk, a series of rollers cylindrically disposed about the axis of said former disk and arranged in the path of movement of said slotted arm, and a spring mounted on said latter disk and bearing against the said arm to retain it in contact with one of said rollers.

12. In a device of the character described, the combination with an actuating-pinion and type-wheels arranged to revolve at different relative speeds, of means for causing said actuating-spindle to drive said type-wheels, said means comprising a spindle driven by said clockwork, a disk mounted on said spindle, a pin projecting from the face of said disk, an arm pivotally mounted on said pin and having a slot in its free extremity, a spindle connected with said type-wheels, a disk mounted on said latter spindle, a pin projecting from the face of said latter disk and being engaged by the walls of the slot in said arm and adapted to actuate said type-wheels by the movement of said former disk, a series of rollers cylindrically disposed and arranged in the path of movement of said slotted arm, a spring mounted on said latter disk and bearing against said arm to retain it in contact with one of said rollers.

In testimony whereof I affix my signature in presence of two witnesses.

RICHARD BÜRK.

Witnesses:
ALBERT GOTT,
CHN. BAUER.